April 14, 1953 R. T. BURNETT 2,634,584
TORUS CHAMBER TYPE HYDROKINETIC TORQUE CONVERTER
Filed Oct. 5, 1946 3 Sheets-Sheet 1

INVENTOR
RICHARD THOMAS BURNETT
BY Cecil J Arens
ATTORNEY.

April 14, 1953   R. T. BURNETT   2,634,584
TORUS CHAMBER TYPE HYDROKINETIC TORQUE CONVERTER
Filed Oct. 5, 1946   3 Sheets-Sheet 2

INVENTOR
RICHARD THOMAS BURNETT
BY Cecil J Arens
ATTORNEY

Patented Apr. 14, 1953

2,634,584

UNITED STATES PATENT OFFICE 2,634,584

TORUS CHAMBER TYPE HYDROKINETIC TORQUE CONVERTER

Richard T. Burnett, South Bend, Ind., assignor to Bendix Aviation Corporation, South Bend, Ind., a corporation of Delaware Application October 5, 1946, Serial No. 701,595

5 Claims. (Cl. 60—54)

This invention relates to infinitely variable transmissions, and more particularly to an improved type of hydro-kinetic torque converter for use therewith.

Many of the present day torque converters have been designed with a view to wide torque variation over a useful efficiency range. However, this objective has been approached only in the use of converters having a plurality of stages but has never been attained by single stage converters of the type herein considered until the advent of the invention herein described.

It is therefore a principal object of the invention to provide a hydro-kinetic torque converter capable of wide torque variation over a useful efficiency range.

It is a further object of the invention to provide a hydro-kinetic torque converter in which the guide blades are of a symmetrical shape and disposed in a manner to receive fluid from directions producing positive and negative torques with a minimum of energy loss.

A still further object of the invention resides in the provision of a hydro-kinetic torque converter in which the fluid flows radially outward through the impeller and radially inward through the turbine and guide.

Another very important object of the invention resides in the provision of a hydro-kinetic torque converter in which the guide blades have rounded inlet edges to thereby form a channel with a sharply contracted section between the rounded inlet edges of the blades so that the shortest distance across a channel formed between adjacent reaction blades is substantially 1.2 times the maximum thickness of the rounded edge of the reaction blades.

An object of the invention resides in the provision of a single stage hydro-kinetic torque converter having its blades so related that the turbine wheel overdrives the impeller wheel.

A yet further important object of the invention resides in the provision of a hydro-kinetic torque converter having turbine blades arranged side by side and provided with rounded inlet edges so as to form a channel between two adjacent blades, said channel having sharply contracted section between the rounded inlet edges of the blades such that the shortest distance across a channel formed between adjacent turbine blades is substantially equal to the maximum of the rounded edge of the turbine blade.

An important object of the invention resides in the provision of a hydro-kinetic torque converter having a bladed turbine wheel the inlet area at the entrance of which is substantially equal to the annular area at the outside of the fluid circuit and to the outlet area at exit of the impeller wheel.

The above and other objects and features of the invention will be apparent from the following description of the device taken in connection with the accompanying drawings which form a part of the specification, and in which.

Before entering into the description of the apparatus of the invention it will be well to point out that the hydro-kinetic torque converter herein disclosed has been built into a full size model and tested for performance.

Figure 2:
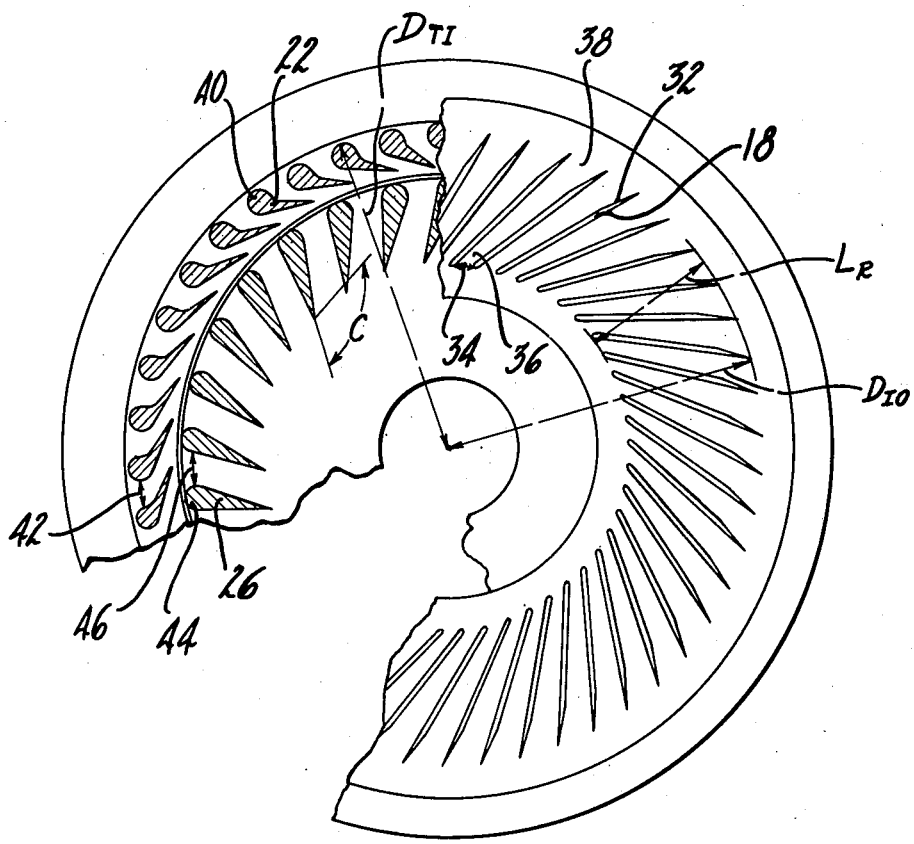
Figure 2 is a diagrammatic illustration of the torque converter showing the blade relationship and profile.
Figure 1:
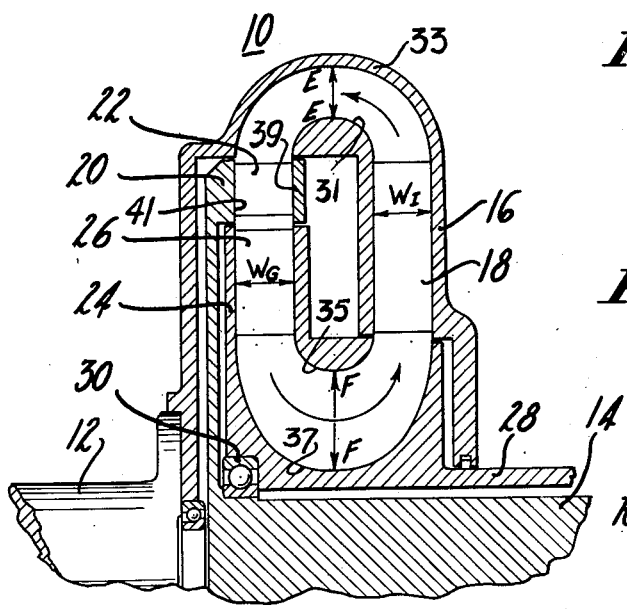
Figure 1 is a diagrammatic illustration of a torque converter made in accordance with my invention.

Referring to Figure 1 of the drawings the reference numeral 10 designates a single stage hydro-kinetic torque converter having a driving shaft 12 and a driven shaft 14. An impeller wheel 16, having blades or vanes 18, is secured to the driving shaft 12, in any suitable manner, to be rotated thereby. A turbine wheel 20, having blades or vanes 22, is suitably secured to the driven shaft to rotate the same. A guide or reaction wheel 24, having blades or vanes 26, is disposed within the housing formed by the impeller wheel 16, and is suitably held against rotation. The guide wheel 24 is integral with a sleeve 28 carried by the driven shaft 14 and supported at one end by a bearing 30.

The rotatable bladed impeller and turbine wheels together with the stationary bladed guide wheel have flow channels defined between the blades and inner and outer contour walls through which liquid may circulate. The flow path of the circuit is substantially rectangular in form as seen in Figure 1. The flow is radially outward through the impeller wheel and radially inward through the turbine and guide wheels. At the outside of the circuit flow is axial to the left as indicated by the arrow. At the inside of the circuit flow is axial to the right as indicated by the arrow. The circumferential or annular area measured across the outer channel E—E between the inner and outer walls 31 and 33 of the impeller wheel is between one and one-half and one and three-fourths times as great as the circumferential or annular area measured across the inner channel F—F between the inner walls 35 and 37 of the guide wheel. These annular areas represent sections through the inner and outer portions of the toroidal channel through which axial flow is maintained. The inlet area of the impeller wheel, which is defined by the circumference at the inlet multiplied by the distance $W_I$, is substantially equal to the inner annular area of the toroidal channel and to the discharge area of the guide wheel, the latter area of which is defined by the circumference at the discharge times the distance $W_G$. Likewise the inlet area to the turbine wheel, which is defined by the circumference at the inlet times the distance $W_G$, is substantially equal to the outer annular area of the toroidal channel and to the discharge area of the impeller wheel, the latter area of which is defined by the circumference at the discharge times the distance $W_I$. These areas, such as "inlet area of the impeller wheel" and the "discharge area of the guide wheel" are cross sectional areas of the toroidal channels of the respective wheels taken at the blade tips.

Wherever the discharge angle of a blade is herein referred to it will be considered as that angle formed between a straight line extension of the blade centerline from the discharge end of the blade and a tangent through the blade tip to the circle of the blade tips measured from that portion of the tangent backward of the blade tip with respect to the direction of rotation of the rotating wheels.

Wherever the inlet angle of a blade is herein referred to it will be considered as that angle formed between a straight line extension of the blade centerline from the inlet end of the blade and a tangent through the blade tip to the circle of the blade tips measured from that portion of the tangent backward of the blade tip with respect to the direction of rotation of the rotating wheels.

The impeller blades 18 are of flat construction with a slight bevel 32 at the exit or discharge end and rounded at the inlet end. The impeller blades are positioned in circular rows around the impeller wheel between the inner and outer walls 31 and 33 to form channels between adjacent blades such that the circumferential distance 34 between adjacent blades increases between the inlet 36 and outlet 38 of the channels. The width $W_I$ of the impeller channel, defined between the inner and outer contour walls 31 and 33 of the impeller wheel, is less than 9% and more than 6% of the impeller blade diameter at the exit end. The radial length $L_R$ of the impeller blade is between two and one-half and three times its width $W_I$. The radius $D_{IO}$ of the impeller wheel measured at the discharge end of the impeller blades is substantially equal to the radius $D_{TI}$ of the turbine wheel measured at the inlet end of the turbine wheel blades. The discharge angle A of the impeller blade is shown to be 69° but may be somewhere between 45° and 75°. The outlet diameter of impeller wheel is substantially one and three-fourths times its inlet diameter.

The turbine blades 22 have rounded inlet edges 40 and are constructed and arranged to be disposed in a circular row around the turbine wheel between inner and outer walls 39 and 41 to provide channels having sharply contracted sections 42 between the rounded inlet edges of adjacent blades. The shortest distance across the sharply contracted section 42 of the channel is substantially equal to the maximum thickness of the rounded inlet edge of the turbine blade. The turbine blades discharge angle B is shown in the drawings as 22½° but may be somewhere between 20° and 30° with satisfactory results. The radial length of the turbine channel is slightly less than its width which is approximately 7½% of its inlet diameter. The diameter of the turbine wheel measured at the discharge end of the turbine wheel blades is less than 10% greater than the diameter of the guide wheel measured at the inlet end of the guide wheel blades. It has been found that blades of this design receive the fluid with a minimum of shock losses.

Figure 3:
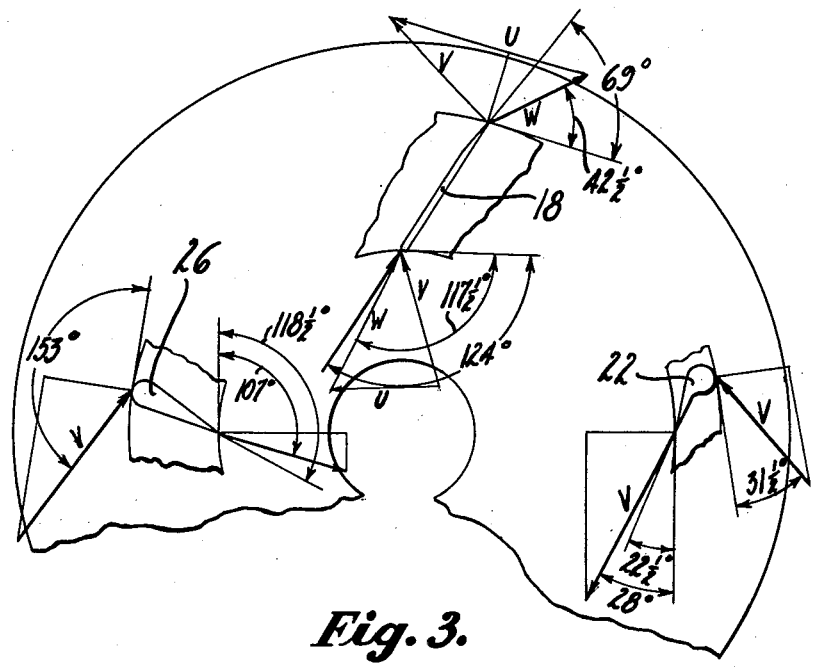
Figure 3 is a diagrammatic showing of the blades of the torque converter including a vector diagram of the flow of fluid in the circuit with turbine stalled.
Figure 4:
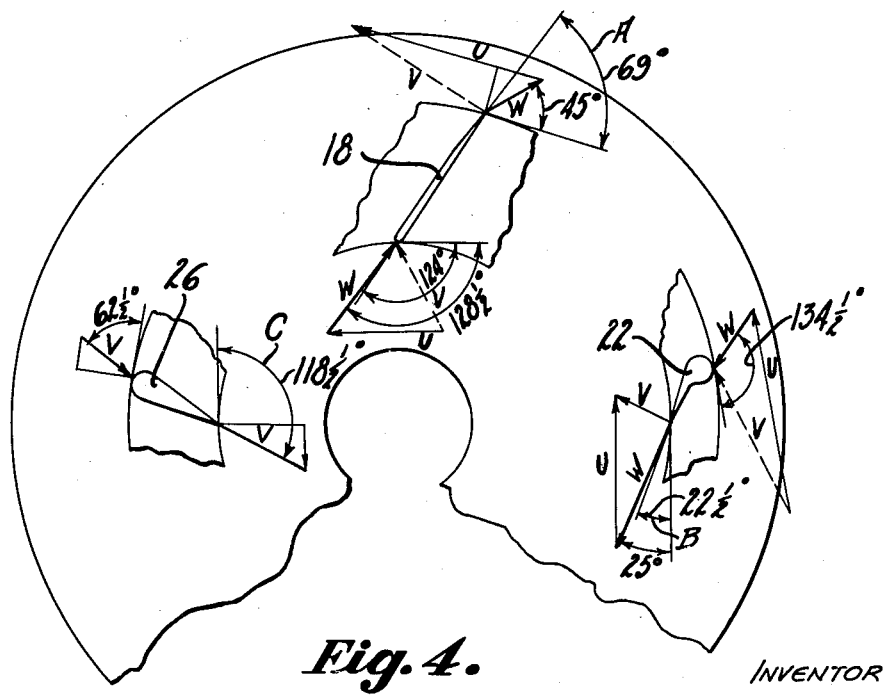
Figure 4 is a diagrammatic showing of the blades of the torque converter including a vector diagram of the flow of fluid in the circuit with a speed ratio of optimum efficiency.
Figure 5:
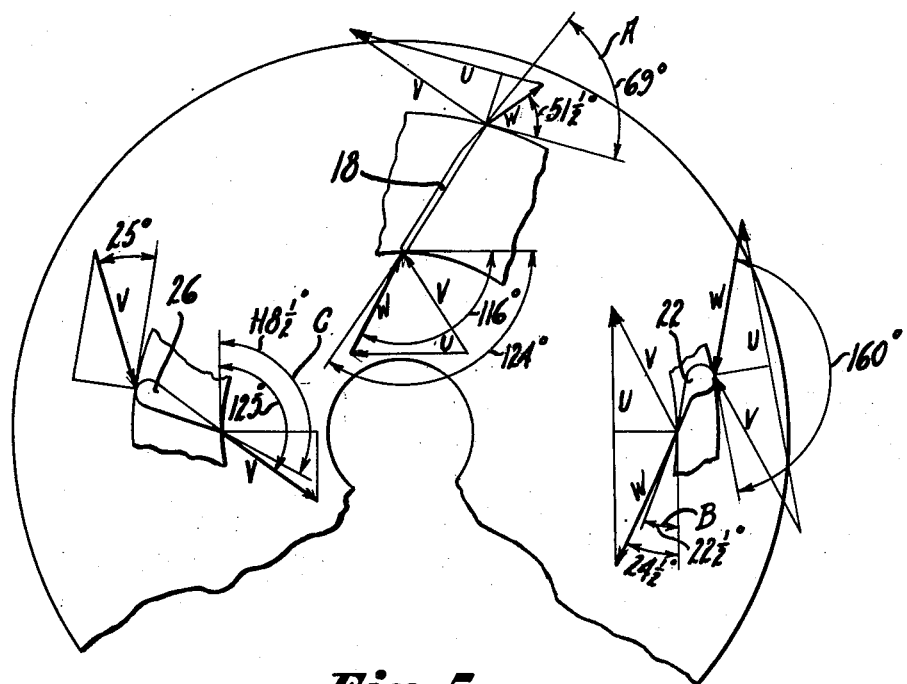
Figure 5 is a diagrammatic showing of the blades of the torque converter including a vector diagram of the flow of fluid in the circuit with turbine overdriving impeller at 1½:1 speed ratio.

The guide blades 26, like the turbine blades 22, have rounded inlet edges 44 and are constructed and arranged in a circular row between the inner and outer walls 35 and 37 to provide channels having sharply contracted sections 46 between the rounded inlet edges of adjacent blades. The shortest distance across these sharply contracted sections of the channel formed by the guide blades is approximately 1.2 times maximum thickness of the rounded inlet edges of the guide blade. These blades are symmetrical in form to receive fluid with a minimum of loss from widely divergent angles of attack on both sides of the centerlines of the blades as best shown in Figures 3 to 5. The radial length of the guide blade is between one and one-half and two times its width $W_G$. The width of the guide channel as measured at the point $W_G$ between the inner and outer walls 35 and 37 is approximately 10% of the diameter of the guide wheel measured at the inlet end of the guide wheel blades. The guide blades have a discharge angle C of between 115° and 125°. The discharge angle of the guide blades is shown to be 118½° and is measured as indicated in Figures 3 to 5. The diameter of the guide wheel measured at the inlet end of the blades is approximately one and one-half times its diameter measured at the discharge end of the blades. This blade relationship provides a channel of unusual length to permit complete utilization of the reaction of the fluid in the circuit.

Figures 3 to 5 present vectorial illustrations of the mean path of flow of fluid through the circuit. Figure 3 shows a vector diagram of the action of the fluid in the circuit at stall, that is, with the turbine wheel at rest. At this time, as can best be seen in the diagram Figure 6, torque multiplication is maximum and of course the efficiency is zero, since the speed ratio is zero and the output is zero. In the present discussion the letters U, W and V will represent respectively the tangential velocity of the wheel, relative velocity of the fluid with respect to the wheel and the absolute velocity of the fluid. Angular momentum of the fluid is unchanged unless some force acts upon the fluid. Therefore the flow in the spaces between blade wheels can be considered to have constant angular momentum, disregarding frictional drag of the walls.

Since the radius of the impeller wheel measured at the discharge end of the blades is the same as the radius of the turbine wheel measured at the inlet end of the turbine blades, and the cylindrical areas of the channels at the impeller wheel discharge and turbine wheel inlet are equal, not only the angular momentum but the absolute velocities of the fluid are equal in magnitude at these two portions of the circuit, and therefore have equal tangential components. However the radial component which is radially outward at the impeller outlet has been turned in the curved outer part of the circuit and becomes a radially inward component.

The absolute velocity of the fluid at the outlet of the turbine wheel blades is substantially the same as the absolute velocity at the entrance to the guide wheel blades since they are at very nearly the same radius and have approximately equal channel areas.

The absolute velocity of the fluid at the discharge end of the guide wheel blades is equal in magnitude to the absolute velocity at the entrance to the impeller wheel blades but has a radially inward component which becomes a radially outward component at the entrance to the impeller wheel blades, the tangential component being the same, since the radii and channel areas are equal at these two points.

Figure 6:
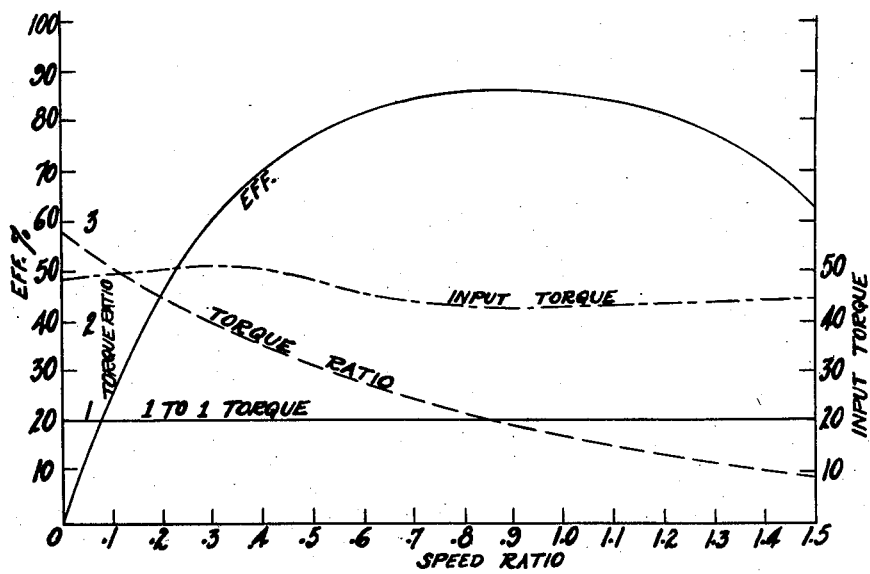
Figure 6 is a diagram showing the characteristics of the device of the invention.

The relative velocity W will vary in angle and magnitude as the wheels change in speed. At stall since the turbine wheel is at rest V equals W. As the guide or reaction member is always stationary V and W at the inlet end of the reaction wheel blades will be the same. The same is true of V and W at the discharge end of the reaction wheel blades. The torque ratio is 2.85 at this time, as shown in Figure 6.

When the converter reaches its point of optimum efficiency the fluid flow through the circuit acts on the blades of the wheels in a different direction, that is, at a different angle, as best shown in Figure 4. It will be noted that relative velocity W at the discharge end of the impeller wheel blades is somewhat less than the corresponding W in Figure 3. It is a general characteristic of hydrodynamic torque converters that quantity of fluid circulation or "flow" is less at optimum efficiencies than at stall and racing. The flow of fluid from the discharge end of the impeller wheel blades acts on the inlet end of the turbine wheel blades in the direction shown at an absolute velocity V. The relative velocity W of the fluid at the inlet of the turbine wheel blades is acting at an angle of approximately 134½° from a line tangent to the inlet end of the turbine wheel blades. At the discharge end of the turbine wheel blades the absolute velocity V of the fluid is in a direction which allows it to enter the guide wheel blades substantially parallel to the centerline of the guide wheel blades whereby the losses in the guide wheel are a minimum. The fluid which flows from the discharge end of the turbine wheel at an absolute velocity V enters the inlet end of the guide wheel blades at an angle of approximately 62½°.

The relative velocity W at the discharge end of the turbine wheel blades has increased considerably and is acting at an angle 25° from a line tangent to the discharge end of the blades. As indicated in Figure 6, when the converter is at its optimum efficiency point the torque ratio is 1 to 1 and the speed ratio is .858. The converter is operating at an efficiency of 85.8% at that time. Also the peak efficiency of the converter is reached at a higher speed ratio than that of any machine of the prior art known to applicant.

Figure 5 shows a vector diagram depicting the action of the fluid in the circuit on the wheels when the converter is in overdrive, that is a speed ratio of 1½ to 1. There is very little change in the relationship of the components of the vector diagram at the discharge end of the impeller wheel blades. Because of the increase in the tangential velocity U of the turbine wheel blades the relative velocity W at the inlet end of the turbine wheel blades has not only grown in magnitude but has changed its direction from approximately 134½° at optimum efficiency to approximately 160° at 1½ to 1 ratio. Since the turbine wheel speed has increased, the absolute velocity V of the fluid at the discharge end of the turbine wheel blades has increased its magnitude and altered its direction from the course parallel to centerline of guide blades. The absolute velocity V of the fluid at the inlet end to the guide wheel blades has also increased its magnitude and changed its direction with respect to the action of the fluid at the corresponding end of the guide wheel blades when at the optimum efficiency point. It will be well to point out that in overdrive the direction of the fluid at the inlet end of the guide wheel blades has an absolute velocity V which imposes a force on the opposite side of the guide blades from that imposed by the fluid at the stall point of the converter (see Figure 3). It is important to note that although the direction of the fluid at the inlet end of the guide wheel blades changes from an angle of approximately 153° at stall to an angle of approximately 25° to 1½ to 1 ratio, the guide wheel remains stationary up to the maximum speed ratio. It should be noted that the torque reaction on the guide wheel is reversed in passing through the 1 to 1 torque ratio. At a time when the converter is overdriving, that is, the turbine wheel having a speed 1½ times the speed of the impeller wheel, the torque ratio is in the neighborhood of .42 and the efficiency is about 62.5%. The input torque (see Figure 6) varies from 48.5 lb. feet at stall to 44.5 at 1½ to 1 speed ratio. As far as is known to applicant all other torque converters having a guide wheel before the impeller show lower input torque capacity at stall than at higher speed ratio when the input speed of the machine is held constant. As the discharge angle of the guide blade is reduced (that is, as the guide discharge angle more nearly approaches the radially inward flow) the input torque characteristic changes so that the torque is greater at stall than at higher speed ratios above .5. This characteristic is desirable in automotive vehicles in reducing engine speed at low speed ratio. This effect is desirable because operators do not like the sensation of high engine speed at low vehicle speed and because low engine speed results in smaller power loss and therefore less waste heat to be dissipated. The construction and arrangement of the converter as aforementioned produces a relatively large torque ratio over a wide speed range, as best shown in Figure 6. No torque converter known to applicant will give equal results.

Although this invention has been described in connection with certain specific embodiments, the principles are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

I claim:

1. A hydrokinetic torque converter comprising rotatable bladed impeller and turbine wheels and a bladed reaction wheel having a common axis, said wheels together forming a toroidal working circuit for fluid, said reaction wheel constituted to take reaction, said toroidal circuit being divided into flow channels defined between the blades and inner and outer contour walls of the wheels for the circulation of fluid, said reaction and turbine blades having rounded inlet edges and arranged respectively in circular rows to provide said channels with sharply contracted sections between said rounded edges of adjacent corresponding blades, the shortest distance across a channel formed between adjacent turbine blades being substantially equal to the maximum thickness of the rounded edge of the turbine blades, the shortest distance across a channel formed between adjacent reaction blades being slightly greater than the maximum thickness of the rounded edge of the reaction blades, said reaction wheel blades being symmetrical in form and arranged to receive fluid from the turbine blades with a minimum of loss over widely divergent angles of attack on both sides of the centerline of the blades, said impeller wheel blades having a discharge angle of not less than 45° nor greater than 75°, said turbine and reaction blades being arranged in the circuit in a plane perpendicular to said common axis and parallel to a second plane containing said impeller blades, said turbine blades being disposed at a greater radius than the reaction blades so that fluid discharged from the impeller blades first passes through the channels formed between the turbine blades and thence through the channels formed between the reaction blades, the diameter of said impeller wheel, measured at the discharge end of the impeller wheel blades, being substantially equal to the diameter of the turbine wheel measured at the inlet end to the turbine blades, the aforesaid blade disposition and channel geometry providing overdrive of the turbine wheel.

2. A hydrokinetic torque converter comprising rotatable bladed impeller and turbine wheels and a bladed reaction wheel having a common axis, said wheels together forming a toroidal working circuit for fluid, said reaction wheel constituted to take reaction, said toroidal circuit being divided into flow channels defined between the blades and inner and outer contour walls of the wheels for the circulation of fluid, said reaction and turbine blades having rounded inlet edges and arranged respectively in circular rows to provide said channels with sharply contracted sections between said rounded edges of adjacent corresponding blades, the shortest distance across a channel formed between adjacent turbine blades being substantially equal to the maximum thickness of the rounded edge of the turbine blades, the shortest distance across a channel formed between adjacent reaction blades being slightly greater than the maximum thickness of the rounded edge of the reaction blades, said impeller wheel blades having a discharge angle of not less than 45° nor greater than 75°, said turbine and reaction blades being arranged in the circuit in a plane perpendicular to said common axis and parallel to a second plane containing said impeller blades, said turbine blades being disposed at a greater radius than the reaction blades so that fluid discharge from the impeller blades first passes through the channels formed between the turbine blades and thence through the channels formed between the reaction blades, the diameter of said impeller wheel, measured at the discharge end of the impeller wheel blades, being substantially equal to the diameter of the turbine wheel measured at the inlet end to the turbine blades, the radial length of the channel formed between the reaction blades and the inner and outer contour walls being substantially one and one-half times the channel width, the radial length of the channel formed between the turbine blades and the inner and outer contour walls being not greater than the channel width, the respective widths of the reaction and turbine wheel flow channels formed between the inner and outer contour walls of their associated wheels being in the neighborhood of ten per cent of the diameter of the turbine wheel measured at the inlet edges of its blades, whereby the converter reaches a peak efficiency at a speed approaching a one-to-one ratio.

3. A hydrokinetic torque converter comprising rotatable bladed impeller and turbine wheels and a bladed reaction wheel having a common axis, said wheels together forming a toroidal working circuit for fluid, said reaction wheel constituted to take reaction, said toroidal circuit being divided into flow channels defined between the blades and inner and outer contour walls of the wheels for the circulation of fluid, said reaction and turbine blades having rounded inlet edges and arranged respectively in circular rows to provide said channels with sharply contracted sections between said rounded edges of adjacent corresponding blades, the shortest distance across a channel formed between adjacent turbine blades being substantially equal to the maximum thickness of the rounded edge of the turbine blades, the shortest distance across a channel formed between adjacent reaction blades being slightly greater than the maximum thickness of the rounded edge of the reaction blades, said impeller blades being substantially flat along the length of the channel except for a beveled edge at the discharge end thereof, said impeller wheel blades having a discharge angle of not less than 45° nor greater than 75°, said turbine and reaction blades being arranged in the circuit in a plane perpendicular to said common axis and parallel to a second plane containing said impeller blades, said turbine blades being disposed at a greater radius than the reaction blades so that fluid discharged from the impeller blades first passes through the channels formed between the turbine blades and thence through the channels formed between the reaction blades, the diameter of said impeller wheel, measured at the discharge end of said impeller wheel blades, being substantially equal to the diameter of the turbine wheel measured at the inlet end to the turbine blades, whereby a relatively high converter efficiency at a one-to-one speed ratio is realized.

4. A hydrokinetic torque converter comprising rotatable bladed impeller and turbine wheels and a bladed reaction wheel having a common axis, said wheels together forming a toroidal working circuit for fluid, said reaction wheel normally held against rotation, said toroidal circuit being divided into flow channels defined between the blades and inner and outer contour walls of the wheels for the circulation of fluid, said turbine and reaction blades being arranged in the circuit in a plane perpendicular to said common axis and parallel to a second plane containing said impeller blades, said turbine blades being disposed at a greater radius than the reaction blades so that fluid discharged from the impeller blades first passes through the channels formed between the turbine blades and thence through the channels formed between the reaction blades, said reaction and turbine blades having rounded inlet edges and arranged respectively in circular rows to provide said channels with sharply contracted sections between said rounded edges of adjacent corresponding blades, said turbine wheel blades being arranged for discharging fluid at an angle of not less than 20° nor more than 30°, said impeller wheel blades having a discharge angle of not less than 45° nor greater than 75° said fluid being received by the turbine blades at an angle somewhere between 30° at stall and 160° at 1½ to 1 ratio between the turbine and impeller wheel speeds, said reaction blades being symmetrical in form for receiving fluid from the turbine blades at an angle somewhere between 153° at stall and 25° at 1½ to 1 ratio between said turbine and impeller wheel speeds and for discharging fluid at an angle of not less than 100° nor greater than 130° to thereby cause the turbine wheel to overdrive the impeller wheel.

5. A hydrokinetic torque converter comprising rotatable bladed impeller and turbine wheels and a bladed reaction wheel having a common axis, said wheels together forming a toroidal working circuit for fluid, said reaction wheel normally held against rotation, said toroidal circuit being divided into flow channels defined between the blades and inner and outer contour walls of the wheels for the circulation of fluid, said turbine and reaction blades being arranged in the circuit in a plane perpendicular to said common axis and parallel to a second plane containing said impeller blades, said turbine blades being disposed at a greater radius than the reaction blades so that fluid discharged from the impeller blades first passes through the channels formed between the turbine blades and thence through the channels formed between the reaction blades, said reaction and turbine blades having rounded inlet edges and arranged respectively in circular rows to provide said channels with sharply contracted sections between said rounded edges of adjacent corresponding blades, said fluid being received by the turbine blades at an angle somewhere between 30° at stall and 160° at one and one half to one ratio between the turbine and impeller wheel speeds, said reaction blades being symmetrical in form for receiving fluid from the turbine blades at a varying angle somewhere between 153° at stall to 25° at 1½ to 1 ratio and for discharging fluid at an angle of not less than 100° nor greater than 130° to thereby cause the turbine wheel to overdrive the impeller wheel.

RICHARD T. BURNETT.

References Cited in the file of this patent

UNITED STATES PATENTS

| Number | Name | Date |
| --- | --- | --- |
| 1,970,236 | Kluge et al. | Aug. 14, 1934 |
| 2,216,411 | Heppner | Oct. 1, 1940 |
| 2,255,430 | Lysholm et al. | Sept. 9, 1941 |
| 2,306,758 | Schneider et al. | Dec. 29, 1942 |